United States Patent
Boyer et al.

(10) Patent No.: US 6,877,128 B2
(45) Date of Patent: Apr. 5, 2005

(54) WEIGHTED ERROR/ERASURE CORRECTION IN A MULTI-TRACK STORAGE MEDIUM

(75) Inventors: Keith Gary Boyer, Thornton, CO (US); Richard Allen Gill, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 470 days.

(21) Appl. No.: 10/017,548

(22) Filed: Dec. 14, 2001

(65) Prior Publication Data

US 2003/0115537 A1 Jun. 19, 2003

(51) Int. Cl.$^7$ .................... G11C 29/00; H03M 13/00
(52) U.S. Cl. .................................. 714/771; 714/784
(58) Field of Search .............................. 714/771, 769, 714/763, 784

(56) References Cited

U.S. PATENT DOCUMENTS

| 4,336,612 A | * | 6/1982 | Inoue et al. ............... 714/755 |
| 5,255,272 A | * | 10/1993 | Gill et al. .................. 714/765 |
| 5,708,637 A | * | 1/1998 | Umemura et al. ....... 369/47.34 |

* cited by examiner

Primary Examiner—Joseph D. Torres
(74) Attorney, Agent, or Firm—Yee & Associates, P.C.

(57) ABSTRACT

A method, computer program product, and data processing system for recovering corrupted data in a multi-track storage medium, such as magnetic tape, using a Reed-Solomon or other similar error correcting code system, is disclosed. A correction history keeping a tally of actual corrected instances of corruption in the storage medium is established. The "N" tracks requiring the greatest number of actual error corrections are designated as erasures. Any errors in the remaining tracks must be found on an individual basis before being corrected.

27 Claims, 4 Drawing Sheets

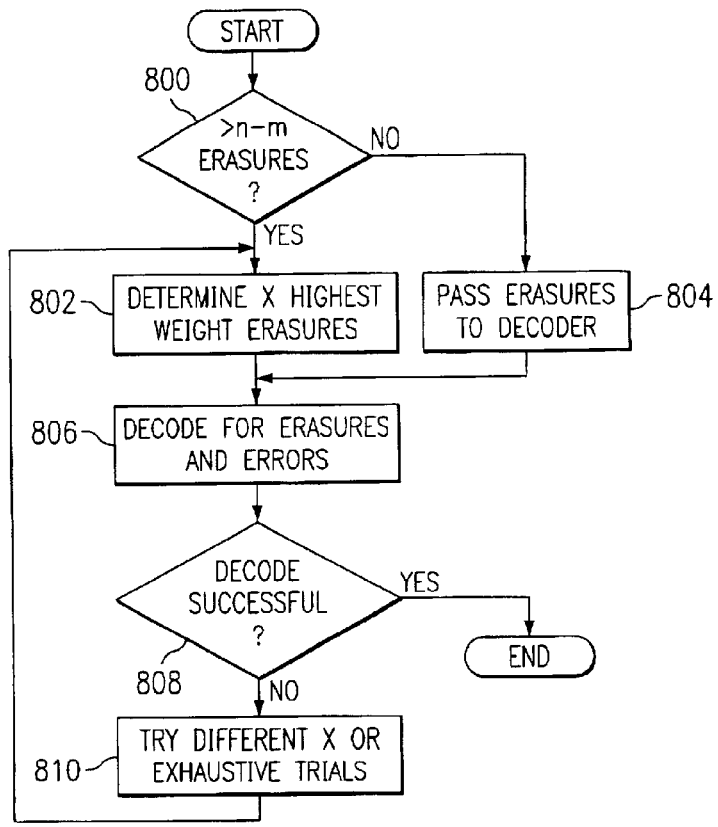
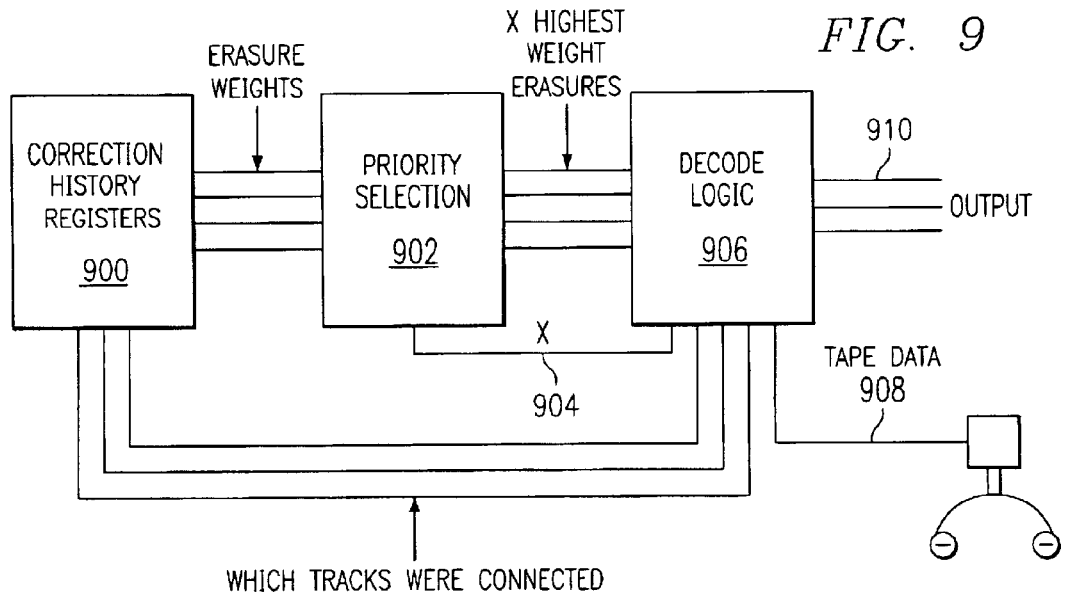

WEIGHTED ERROR/ERASURE CORRECTION IN A MULTI-TRACK STORAGE MEDIUM

FIELD OF THE INVENTION

The present invention relates generally to the application of error correcting codes to storage media. Specifically, the present invention provides a method, computer program product, and data processing system for correcting errors and erasures in a storage medium having multiple tracks of data.

BACKGROUND OF THE INVENTION

Error correcting codes (ECCs) play a vital role in today's world. As storage systems pack more and more information into smaller physical spaces, as wireless and other communications systems transmit data over cluttered communications media, as our technology pushes the limits of physics, there is an ever-increasing need to be protected from data errors. Compact discs, magnetic tapes and disks, memory chips, and satellite transmissions are among the many technologies that are prone to error from physical forces, yet we take these things for granted. The Voyager spacecraft developed by NASA in the 1970s, for instance, transmits radio signals to Earth with less power than emitted by an ordinary 60-watt light bulb, yet it has captured some of the clearest pictures of the outer planets taken to date.

A remarkable technology makes all of this reliability possible. All of these technologies rely, at least in part, on the use of error-correcting codes. Error correcting codes add a sufficient level of redundancy to a piece of data to be able to recover the data should the data become corrupted. Many such error correcting codes have been developed, such as Hamming codes, which are described in Hamming, R. W., *Error detecting and error correcting codes, Bell System Tech. J.*, 26 (1950), pp. 147–160.

Many modern applications that make use of error correcting codes use what are known as Reed-Solomon codes, including the Voyager spacecraft and compact discs (which use a variant of Reed-Solomon codes known as CIRC, Cross-Interleaved Reed-Solomon Codes). Reed-Solomon codes were first described in Reed, I. S. and G. Solomon, *Polynomial Codes over Certain Finite Fields, J. Soc. Ind. Appl. Math.*, 8 (1960), pp. 300–304.

The Reed-Solomon codes are part of a family of codes known as Bose-Chauduri-Hocquenghem (BCH) codes. BCH codes have the desirable property that they can correct a large number of errors with a minimum of redundant information; BCH codes can also correct a larger number of errors if the locations of the errors are known in advance. Errors with known locations are called "erasures" in the art. Also, in the art, an "error" is an error with an unknown location. Several algorithms, such as the Berlekamp-Massey algorithm, are known to those skilled in the art for efficiently decoding BCH codes to recover erasures and errors. Several of these algorithms are described in Blahut, Richard E., *The Theory and Practice of Error Correcting Codes*, Addison-Wesley, Reading, Mass. (1983), pp. 161–206.

Mathematically, a Reed-Solomon code maps values from a vector space of a first dimension over a finite field to a vector space of a second, higher dimension over the same field. The values in the second vector space correspond to coefficients of a set of linear equations, the solution to which is the data to be recovered. The element of redundancy in a Reed-Solomon code stems from the fact that the number of linear equations provides exceeds the minimum number "m" needed to recover the data, and that any "m" of the equations are linearly independent. In other words, you can recover the data by solving any "m" of the equations as a system.

Algorithms such as the Berlekamp-Massey algorithm described previously, perform this decoding step efficiently, taking into account the known locations of erasures (that is, which of the linear equation coefficients have been corrupted) so as to be able to recover a greater amount of data when erasures can be identified.

In any Reed-Solomon code, the entire vector of data can be recovered only if $$2t+e \leq n-m$$

where "t" is the number of errors, "e" is the number of erasures, "n" is the number of linear equations available to choose from (i.e., the dimension of the second vector space), and "m" is the is the minimum number of linear equations necessary to recover the data. In other words, it takes one more uncorrupted linear equation to find an error than it does to simply correct one.

Reed-Solomon codes, because they rely on the use of multiple sets of coefficients, are easily adapted for use in multi-track recording media, such as magnetic tape. An encoded vector of data can be made to span multiple tracks, such that the coefficients for each of the Reed-Solomon equations reside on a separate track. In that way, if one or more tracks become corrupted, but at least "m" tracks can be read successfully, the entire original vector of data can be recovered. Of course, identifying those "m" tracks is easier when some of the corrupted tracks are already known.

Error detecting codes provide a way of identifying errors in a stream of data. One very effective error-detecting code is the cyclic redundancy check (CRC). CRC codes are described in Messmer, Hans-Peter, *The Indispensable PC Hardware Book*, 2d. Ed., Addison-Wesley, Reading, Mass. (1995), pp. 694–702. An erasure on a particular track can be identified by interposing CRC codes on each track at periodic intervals. The CRC codes act as a sort of checksum for the data they follow. An erasure can be identified by comparing a CRC code calculated from a block of data on a given track with the CRC code recorded at the end of the block.

While this is an accurate way to identify a track containing corrupted data, it says nothing about the location within the block of data or the extent of the corruption. Thus, a section of magnetic tape with small amounts of corruption on all or most of the tracks will appear as all containing erasures simultaneously, when in fact, there may only be isolated incidents of corruption on different tracks at different times. If, in such a situation, all of the tracks known to contain errors are treated as erasures, no data will be recovered, since the erasure tracks will be disregarded as corrupted, and there will not be enough remaining tracks to be able to recover the data.

Thus, while identification of erasures is helpful when large amounts of data on a given track are corrupted, it can cause problems when small errors are randomly distributed across many of the tracks. It would, thus, be desirable to have a system for correcting errors in a multi-track medium that is adapted to handle both large erasures and small errors.

SUMMARY OF THE INVENTION

The present invention provides a method, computer program product, and data processing system for recovering corrupted data in a multi-track storage medium, such as magnetic tape, using a Reed-Solomon or other similar error correcting code system. A correction history keeping a tally of actual corrected instances of corruption in the storage medium is established. The "N" tracks requiring the greatest number of actual error corrections are designated as erasures. Any errors in the remaining tracks must be found on an individual basis before being corrected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart representation of a process of error correction code decoding a block of data for a multi-track medium using a variable number of erasures in accordance with a preferred embodiment of the present invention; and FIG. 9 is a block diagram of special-purpose hardware for performing error correction in an alternative embodiment of the present invention.

DETAILED DESCRIPTION OF THE PREFERRED EMBODIMENT

Figure 1:
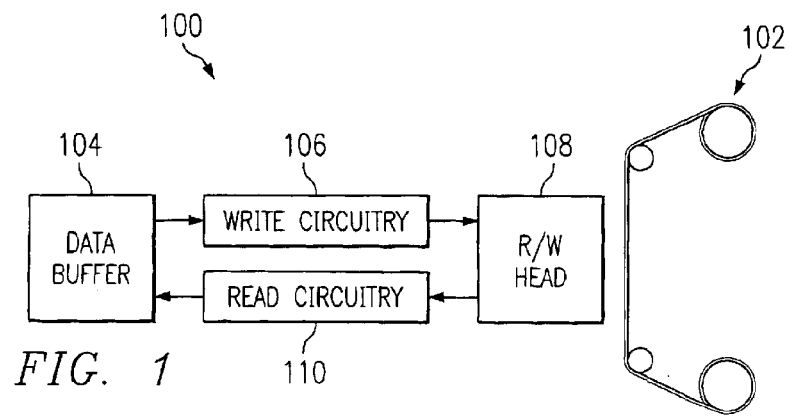
FIG. 1 is an external view of a data processing system in which the processes of the present invention may be performed.

FIG. 1 is a diagram representing an overall view of a multi-track recording device (tape drive 100) in accordance with a preferred embodiment of the present invention. The present invention provides a method, computer program product, and data processing system for correcting errors in a multi-track data storage medium. One commonly used multi-track data storage medium is magnetic tape. The embodiment herein disclosed utilizes magnetic tape as the physical data storage medium, but one of ordinary skill in the art will recognize that the present invention is applicable in conjunction with any physical data storage medium utilizing multiple tracks of data.

Tape drive 100 reads and writes data to/from magnetic tape 102. Data buffer 104 acts as a temporary storage location for data read from or being written to magnetic tape 102. Write circuitry 106 reads data from data buffer 104, processes the data, and transmits the processed data to read/write head 108 for writing to magnetic tape 102. Write circuitry 106's processing of the data includes encoding the data with an error correcting code, such as a Reed-Solomon code, and may include additional processes such as appending error-detecting codes such as CRC codes to the data.

Read circuitry 110 performs what is essentially the opposite transaction as write circuitry 106. Read circuitry 110 decodes data read from magnetic tape 102 by read/write head 108, correcting errors as necessary, and writes the data to data buffer 104.

In a preferred embodiment of the present invention, tape drive 100 is associated with a host computer or network (not shown), and data buffer 104 is read from and written to by the host computer or by other devices (such as computers or network-connected peripherals). For example, a host computer may write data to data buffer 104, which is then written by tape drive 100 to magnetic tape 102.

The subject of the present invention is the error-correction decoding of data from a multi-track storage medium. Thus, the present invention is primarily concerned with the operation of read circuitry 110 as it decodes data stored on magnetic tape 102 that is encoded with an error-correcting code.

Figure 2:
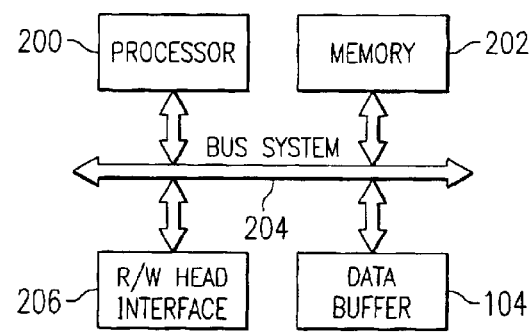
FIG. 2 is a block diagram of such a data processing system.

FIG. 2 is a block diagram depicting read circuitry in accordance with a preferred embodiment of the present invention. Note that the circuitry in FIG. 2 may also be used for performing tasks associated with write circuitry 106 in FIG. 1 or other tasks within tape drive 100, as appropriate.

A processor 200 functions as the control center for read circuitry 110 (or tape drive 100, generally, in one possible embodiment). Processor 200 communicates through memory 202 through bus system 204. Memory 202 holds a set of instructions that is executed by processor 200 to carry out the processes of the present invention described in subsequent Figures. Also connected to device bus 202 is a read/write head interface 206, which allows processor 200 to control the reading and writing of data to/from magnetic tape 102 via read/write head 108. Data buffer 104, which is preferably some type of random-access memory (RAM) is also connected to bus system 204 to allow processor 200 to read and write data to/from data buffer 104. In an alternative embodiment, memory 202 and data buffer 104 are combined into a single bank of memory.

Processor 200 executes a set of instructions located in memory 202. As used in this application, the term "instructions" is to be interpreted broadly so as to encompass a wide variety of functional descriptive material that enables the processor to execute the processes of the present invention. In the conventional sense, instructions are a series of commands, that when executed in sequence by the processor, cause the processor to perform the processes of the present invention. A machine language program or a program written in a high-level computer language, such as C or C++ would include instructions, in this conventional sense.

For the purposes of this document, however, "instructions" are also taken to include a set of facts and rules of inference that, when processed by processor 200, cause processor 200 to follow a course of action that carries out the processes of the present invention. Such instructions could be written in a logic-programming or relational language such as Prolog. "Instructions" also include, for the purposes of this document, functions and expressions written in a functional programming language, such as Lisp. One of ordinary skill in the art will recognize that functional descriptive material of various other forms may be considered instructions for the purposes of the present document without departing from the scope and spirit of the present invention.

The depicted example in FIG. 2 and above-described hardware examples are not meant to imply architectural limitations. The actual hardware used to execute the processes of the present invention may vary.

Figure 3:
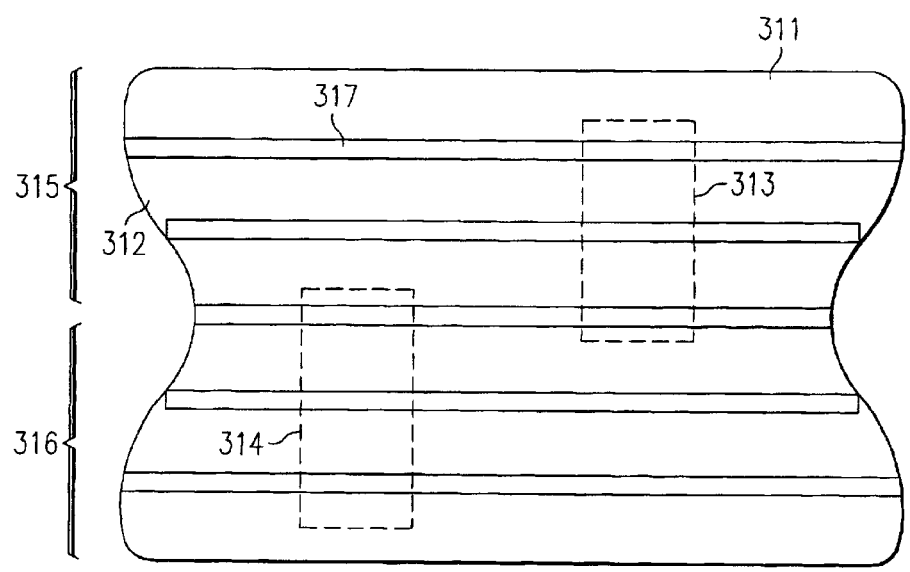
FIG. 3 is a diagram depicting multi-track magnetic tape.

Referring to FIG. 3, a one-half inch wide length of magnetic tape 311 may contain up to 288 or more data tracks, such as data track 317, on multiple data stripes 312. A thin film magnetic read head is shown in upper position 313 and lower position 314 to read data from data tracks 312. If a tape read head has sixteen elements and, with movement of the head to multiple positions, each element can read nine tracks. In order to read more tracks, such as 288 in the desired configuration, two data bands 315 and 316 are utilized. The tape head is movable to nine tracking positions in each of upper position 313 and lower position 314. That is, with the tape head in position 313 it can read 144 tracks in data band 315 and in position 314 it can read 144 tracks in data band 316.

In a preferred embodiment of the present invention, blocks of data are stored across tracks in encoded form using an error-correcting code, such as a Reed-Solomon code. This provides a level of data redundancy (in an information-theoretical sense) between tracks, such that if one or more of the tracks contains errors, redundant information in other tracks can be used to correct the error.

Figure 4:
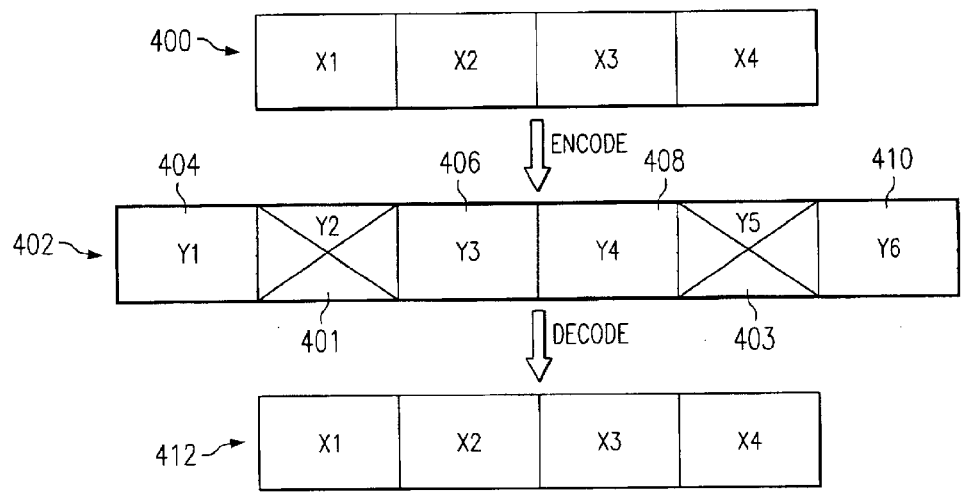
FIG. 4 is a diagram depicting a process of error correction in accordance with a preferred embodiment of the present invention.

FIG. 4 is a graphic representation of how an error correcting code, such as a Reed-Solomon code, can correct errors in a multi-track data storage medium, in accordance with a preferred embodiment of the present invention. Block 400 is a block of data. Block 400 comprises four units (e.g., words, bytes, nibbles, etc.) of raw data. Using an error-correcting code, these four units of data are transformed into block 402, which contains six units of encoded data.

The key to an error-correcting code is that to recover the original data, not all of the encoded data is needed. Thus, if some of the encoded data gets corrupted or lost, the original data may still be recoverable if enough units of the encoded data are intact. In a multi-track data storage medium, it makes sense to place each of the units of encoded data on separate physical tracks, since physical corruption of the media may be confined to particular physical locations on the tape. Thus, some tracks of a multi-track medium may become corrupted while others remain unaffected.

For example, in FIG. 4, any four out of the six units of encoded data are all that are needed to recover the original data. Thus, if units 401 and 403 are corrupted, units 404, 406, 408, and 410 can be decoded to form decoded block 412, which is identical to the original block 400.

A careful examination of FIG. 4 reveals that there are two key pieces of information that are needed to reconstruct an original block of data from its encoded version. The first and most clearly needed piece of information that is needed is the encoded data itself. The second, not so clear, is the locations of the actual errors. For example, in FIG. 4, we need to know that units 401 and 403 are corrupted before we can choose to decode the data using units 404, 406, 408, and 410.

It turns out that with many codes, the locations of the errors can be determined algorithmically, provided enough "good" (uncorrupted) data exists. In the case of a Reed-Solomon code, for instance, an extra unit of "good" data is needed in order to identify the location of an error.

Since magnetic tape and many other multi-track media store data and are read in linear sequential format, however, it is not possible to know with complete certainty where the errors in a given block of data are located. The present invention uses historical error correction data to make an "educated guess" as to which tracks are corrupted at any given location on the storage medium. Specifically, a preferred embodiment of the present invention selects a limited number of tracks with high past occurrence of errors to be treated as "erasures." Essentially, this means that these selected tracks are assumed to be corrupted and are ignored when the data is decoded.

What this means is that if one of these selected erasure tracks has an error occur on it at a particular point, less "good" data will be needed for decoding, since there is no need to identify where the error on the erasure track has occurred. The trade-off for this increase in efficiency is that if an erasure track is actually uncorrupted at a particular point, the uncorrupted data (which otherwise would be used for decoding) will be wasted. Thus, a preferred embodiment of the present invention limits the number of designated erasure tracks to those considered most likely to contain an error.

Figure 5:
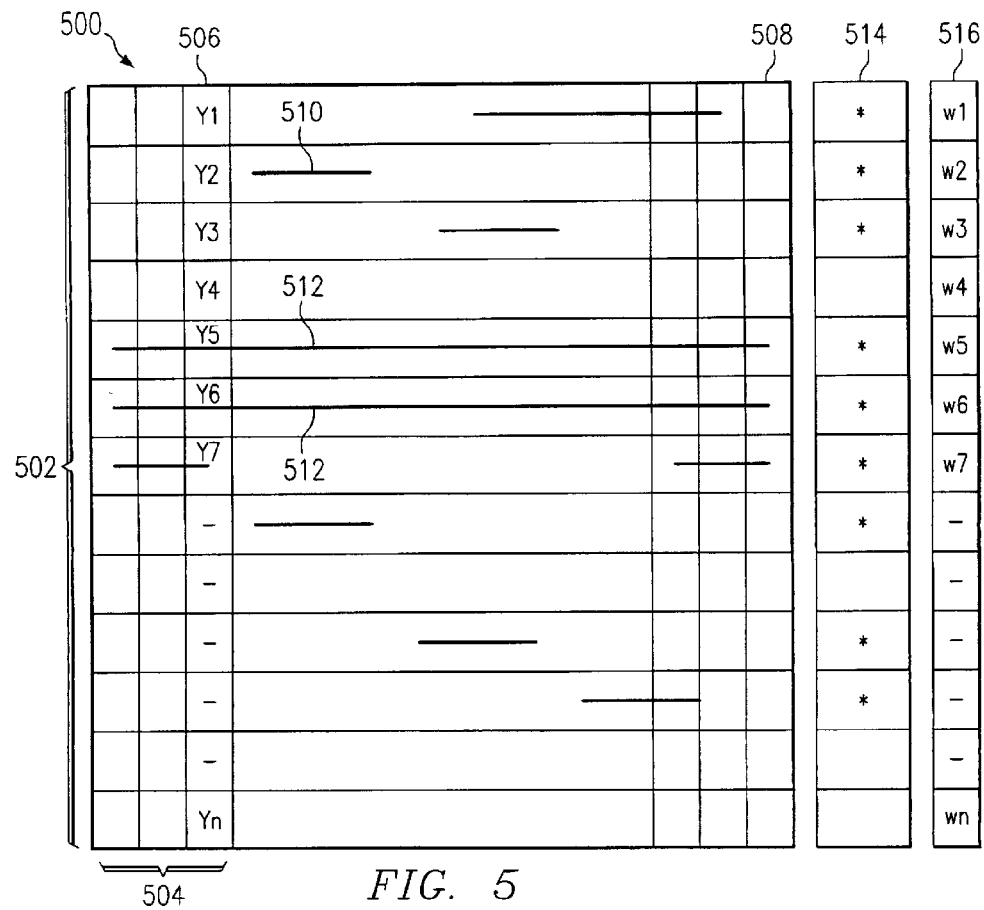
FIG. 5 is a diagram illustrating how the processes of a preferred embodiment of the present invention may be applied to a multi-track data storage medium to maximize error-correcting capabilities.

FIG. 5 is a diagram illustrating how the processes of a preferred embodiment of the present invention may be applied to a multi-track data storage medium to maximize error-correcting capabilities. Chart 500 represents a length of multi-track magnetic tape. A plurality of tracks 502 span the width of the tape. At periodic locations along the length of the tape, blocks 504 of Reed-Solomon-encoded data are stored. Block 506, for instance, is depicted as storing "n" units of Reed-Solomon encoded data (i.e., "n" Reed-Solomon coefficients).

Errors are present on the recording surface and are represented by black bars on the diagram. Error 510 is a small isolated error, whereas errors 512 are long portions of corrupted or erased data. At the end of the portion of tape, a checksum block 508 stores checksums, preferably some kind of cyclic redundancy check (CRC) value. Checksum block 508 can be used to identify data errors on tracks over a length of tape. Preferably, checksum blocks are present at periodic intervals along the length of the tape.

Checksum block 508 can detect that an error has occurred on a track over the length of tape, but it does not help in determining how extensive the errors are. In other words, checksum block 508 cannot be used to tell the different between a small error such as error 510 and a large error such as errors 512.

What a preferred embodiment of the present invention does, however, to alleviate the situation is to calculate weights 516 for each track. These weights are preferably a measure of the number of errors corrected on each track as the track is read. In other words, in a preferred embodiment, each time an error on a given track is corrected, the weight for that track is increased. In this way the top "x" number of tracks in terms of highest weight can be designated as erasure tracks and thus ignored in the decoding process. Thus, long stretches of errors such as errors 512 will likely be treated as erasures, allowing more "good" data to be used for correcting isolated errors such as error 510.

As the storage medium is read from and the weights updated, the designated erasure tracks will change, depending on which tracks the most number of errors are occurring on at each particular position along the length of the storage medium. This allows a storage system to adapt to changing conditions as different physical locations along the medium are read. In a preferred embodiment of the present invention, these updates in erasure tracks are performed periodically, each time a checksum block is encountered.

In one embodiment of the present invention, all tracks that have contained errors at some point, shown in block 514, are treated as erasures until the number of errors and erasures at some point on the medium is so large as to make the errors at that point uncorrectable. In such case, low-weight erasures are removed from the set of designated erasures until all of the errors can be corrected.

Figure 6:
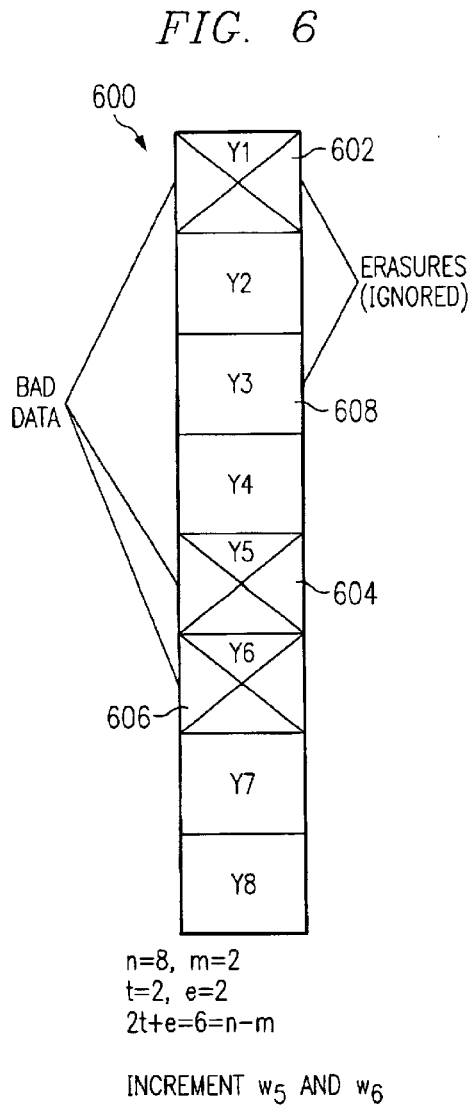
FIG. 6 is a diagram depicting a process of decoding one block of Reed-Solomon encoded data from a multi-track magnetic tape in accordance with a preferred embodiment of the present invention.

FIG. 6 depicts a process of decoding one block of Reed-Solomon encoded data from a multi-track magnetic tape in accordance with a preferred embodiment of the present invention. Block 600 includes eight Reed-Solomon coefficients (denoted "n" in the diagram, thus n=8). Block 600 represents two units of data (i.e., "m", the size of the original amount of data, is 2). Two tracks, and thus two of the coefficients, coefficients 602 and 608, are designated as erasures (i.e., "e" the number of erasures, is 2). Coefficient 602, which is treated as an erasure, is corrupted. Coefficients 604 and 606, which are not on erasure tracks, are also corrupted (i.e., "t" the number of errors [other than erasures], is 2). It is well known in the art that in the case of a Reed-Solomon code, if the following inequality holds, then the original data can be recovered:

$$2t+e \leq n-m.$$

In this case, $2t+e=6=n-m$, so the inequality is satisfied. Thus, the errors may be corrected. In addition, the weights for tracks 5 and 6 (corresponding to coefficients 604 and 606) will be increased, as errors were corrected on these tracks.

Figure 7:
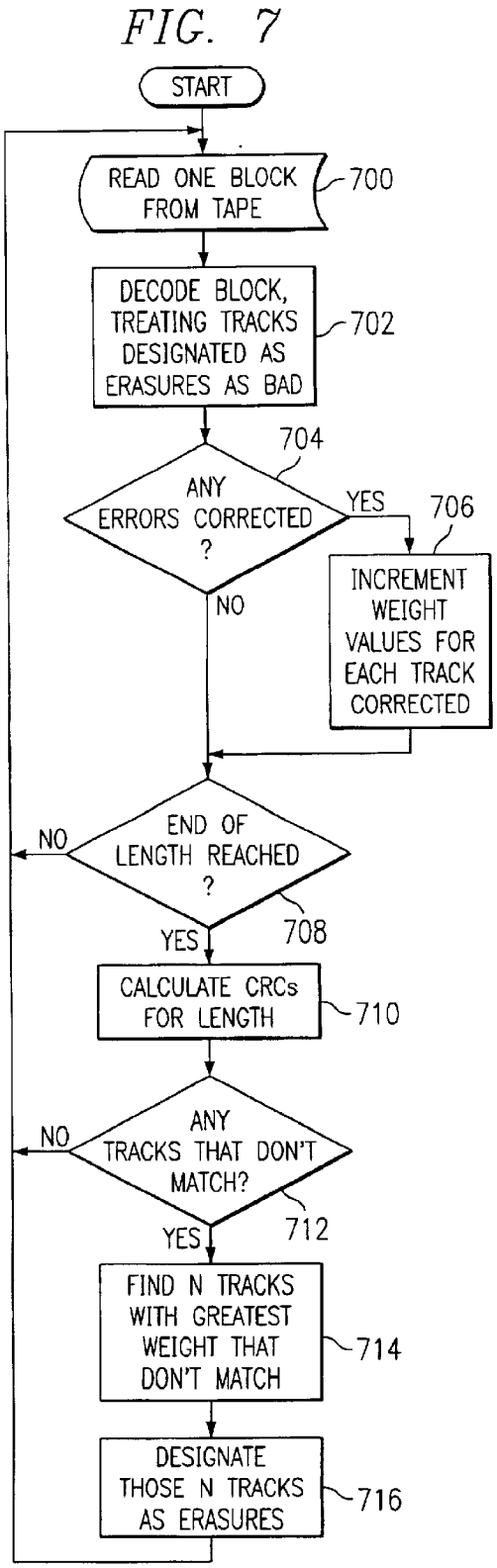
FIG. 7 is a flowchart representation of a process of correcting errors in a multi-track storage medium in accordance with a preferred embodiment of the present invention.

FIG. 7 is a flowchart representation of a process of correcting errors in a multi-track data storage medium in accordance with a preferred embodiment of the present invention. A block of encoded data is read from the storage medium (in this case, a tape) (step 700). The block is decoded, while treating certain tracks designated as erasure tracks as containing corrupted data (step 702).

If any errors were corrected in decoding the block (step 704:Yes), the weight values for the tracks containing the errors are updated (step 706). If the end of a length of tape (containing a cyclic redundancy check or other suitable checksum) has not yet been reached (step 708:No), the process cycles to step 700 for further data reading.

If the end of the length has been reached (step 708:Yes), cyclic redundancy checks (or other suitable checksums) are calculated for the length of tape read (step 710). If there are no tracks that do not match (i.e., no errors occurred on the length of tape) (step 712:No), the process cycles to step 700 to continue reading data.

If, however, errors are detected (step 712:Yes), the "N" tracks with highest weight that contained errors in the previous length are identified (step 714). Those tracks are then designated as the new erasure tracks (step 716).

FIG. 8 is a flowchart representation of a process of error correction code decoding a block of data for a multi-track medium using a variable number of erasures in accordance with a preferred embodiment of the present invention. The process described in FIG. 8 starts with a number of erasures being already defined. For example, all tracks that have previously contained errors may be designated erasure tracks at the beginning of the process described in FIG. 8.

First, the number of designated erasures is checked to see if it exceeds the "order of the code" (step 800). In other words, the number of erasures is checked to see if it exceeds that amount which the code will allow to be decoded (the n−m in the $2t-e \leq n-m$ equation described earlier in this document). If so (step 800:Yes), then the "x" highest-weight erasures are then designated current set of erasures and passed to the decoder (decoding software or hardware or a combination of both), with "x" being some number less than or equal to n−m (step 802). If not (step 800:No), then the current set of erasures is simply passed to the decoder (step 804).

Next, the decoder attempts to decode the block of data from the multi-track medium (step 806). If the decoding was successful (step 808:Yes), then the process ends. If the decoding was not successful (step 808:No), a different "x" is tried or different coefficients are used for the decoding (step 810) and the process cycles to step 802, so as to (eventually) make an exhaustive search of all the decoding possibilities until the block is successfully decoded.

Although the processes of the present invention have been described as being executed by an embedded stored-program computer system as in FIG. 2, the processes of the present invention need not be carried out by such hardware. For example, FIG. 9 is a block diagram of "hard-wired" (special-purpose) hardware for carrying out the processes described herein. The apparatus described in FIG. 9 may be implemented in digital logic using conventional synthesis techniques.

Correction history registers 900 store weights for each track that has been corrected. These weights are fed into priority selector 902, which selects the "X" highest weight erasures according to "X" input 904, which is derived from decode logic 906. Decode logic 906 decodes tape data 908 using the "X" highest-weight erasures as determined by priority selector 902. Any adjustments to "X" necessary to ensure complete decoding of tape data 908 are made by transmitting a new "X" value to priority selector 902 through "X" input 904. Properly decoded data is sent to output 910, from which the data may be written to data buffer 104 (FIG. 1).

It is important to note that while the present invention has been described in the context of a fully functional data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of correcting errors in a data storage medium having a plurality of tracks, comprising:
    decoding a first quantity of data that is encoded using an error-correcting code and that spans multiple tracks from the plurality of tracks;
    writing to a correction history record to indicate a first subset of tracks in the multiple tracks that contained errors when the first quantity of data was decoded; and
    decoding a second quantity of data that is encoded using the error-correcting code and that spans the multiple tracks, wherein a second subset of tracks in the multiple tracks are designated as erasures in accordance with the correction history record such that not all of the multiple tracks that contained errors when the second quantity of data was decoded are present in the second subset.

2. The method of claim 1, further comprising:
   establishing a correction history record.

3. The method of claim 1, wherein the error correcting code is a Bose-Chauduri-Hocquenghem (BCH) code.

4. The method of claim 3, wherein the Bose-Chauduri-Hocquenghem code is a Reed-Solomon code.

5. The method of claim 1, wherein the data storage medium is magnetic tape.

6. The method of claim 1, further comprising:
   calculating a weight for each of the multiple tracks, based upon the correction history record; and
   selecting the second subset of tracks to be treated as erasures based upon the calculated weight for each of the multiple tracks.

7. The method of claim 6, further comprising:
   examining the correction history record to determine a number of errors found on each of the multiple tracks; and
   calculating the weight for each of the multiple tracks as a function of the number of errors found on each of the multiple tracks.

8. The method of claim 1, further comprising:
   removing a data track from the second subset based on a calculated weight for the data track when a quantity of erasures and errors eliminates an ability to correct errors.

9. A computer program product in a computer-readable medium, for correcting errors in a data storage medium having a plurality of tracks, comprising instructions for:
   decoding a first quantity of data that is encoded using an error-correcting code and that spans multiple tracks from the plurality of tracks;
   writing to a correction history record to indicate a first subset of tracks in the multiple tracks that contained errors when the first quantity of data was decoded; and
   decoding a second quantity of data that is encoded using the error-correcting code and that spans the multiple tracks, wherein a second subset of tracks in the multiple tracks are designated as erasures in accordance with the correction history record such that not all of the multiple tracks that contained errors when the second quantity of data was decoded are present in the second subset.

10. The computer program product of claim 9, comprising additional instructions for:
    establishing a correction history record.

11. The computer program product of claim 9, wherein the error correcting code is a Bose-Chauduri-Hocquenghem (BCH) code.

12. The computer program product of claim 11, wherein the Bose-Chauduri-Hocquenghem code is a Reed-Solomon code.

13. The computer program product of claim 9, wherein the data storage medium is magnetic tape.

14. The computer program product of claim 9, comprising additional instructions for:
    calculating a weight for each of the multiple tracks, based upon the correction history record; and
    selecting the second subset to be treated as erasures based upon the calculated weight for each of the multiple tracks.

15. The computer program product of claim 14, comprising additional instructions for:
    examining the correction history record to determine a number of errors found on each of the multiple tracks; and
    calculating the weight for each of the multiple tracks as a function of the number of errors found on each of the multiple tracks.

16. The computer program product of claim 9, comprising additional instructions for:
    removing a data track from the second subset based on a calculated weight for the data track when a quantity of erasures and errors eliminates an ability to correct errors.

17. A data processing system for correcting errors in a data storage medium having a plurality of tracks, comprising:
    a bus system;
    a processing unit having at least one processor and connected to the bus system;
    memory connected to the bus system; and
    a set of instructions in the memory, wherein the processing unit executes the set of instructions to perform the acts of:
       decoding a first quantity of data that is encoded using an error-correcting code and that spans multiple tracks from the plurality of tracks;
       writing to a correction history record to indicate a first subset of tracks in the multiple tracks that contained errors when the first quantity of data was decoded; and
       decoding a second quantity of data that is encoded using the error-correcting code and that spans the multiple tracks, wherein a second subset of tracks in the multiple tracks are designated as erasures in accordance with the correction history record such that not all of the multiple tracks that contained errors when the second quantity of data was decoded are present in the second subset.

18. The data processing system of claim 17, wherein the processing unit executes the set of instructions to perform the additional act of:
    establishing a correction history record.

19. The data processing system of claim 17, wherein the error correcting code is a Bose-Chauduri-Hocquenghem (BCH) code.

20. The data processing system of claim 19, wherein the Bose-Chauduri-Hocquenghem code is a Reed-Solomon code.

21. The data processing system of claim 17, wherein the data storage medium is magnetic tape.

22. The data processing system of claim 17, wherein the processing unit executes the set of instructions to perform the additional acts of:
    calculating a weight for each of the multiple tracks, based upon the correction history record; and
    selecting the second subset to be treated as erasures based upon the calculated weight for each of the multiple tracks.

23. The data processing system of claim 22, wherein the processing unit executes the set of instructions to perform the additional acts of:
    examining the correction history record to determine a number of errors found on each of the multiple tracks; and calculating the weight for each of the multiple tracks as a function of the number of errors found on each of the multiple tracks.

24. The data processing of claim 17, wherein the data processing system is connected to a data storage device.

25. The data processing system of claim 17, wherein the data processing system is embedded within a data storage device and the data storage device reads the data storage medium.

26. The data processing system of claim 25, wherein the data storage device reads the data storage medium using a read/write head and a read/write interface that allows the processing unit to control reading from and writing to the data storage medium.

27. The data processing system of claim 17, wherein the processing unit executes the set of instructions to perform the additional act of:

removing a data track from the second subset based on a calculated weight for the data track when a quantity of erasures and errors eliminates an ability to correct errors.

* * * * *